US012801206B2

(12) United States Patent
Floutier et al.

(10) Patent No.: US 12,801,206 B2
(45) Date of Patent: Nov. 17, 2026

(54) INTERACTION PERIPHERAL, DETECTION METHOD, VIRTUAL REALITY HEADSET, METHOD FOR REPRODUCING A REAL POINT IN VIRTUAL SPACE, DEVICE AND METHOD FOR VIRTUALIZING A REAL SPACE

(71) Applicant: Orange, Issy-les-Moulineaux (FR)

(72) Inventors: Christophe Floutier, Chatillon Cedex (FR); Maxime Jouin, Chatillon Cedex (FR); Valérie Ledunois, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/786,876

(22) PCT Filed: Dec. 16, 2020

(86) PCT No.: PCT/FR2020/052466
§ 371 (c)(1),
(2) Date: Jun. 17, 2022

(87) PCT Pub. No.: WO2021/123619
PCT Pub. Date: Jun. 24, 2021

(65) Prior Publication Data

US 2023/0042781 A1 Feb. 9, 2023

(30) Foreign Application Priority Data

Dec. 17, 2019 (FR) ...................................... 1914655

(51) Int. Cl.
*G06F 3/01* (2006.01)
*G01S 17/42* (2006.01)
(Continued)

(52) U.S. Cl.
CPC ............. *G06F 3/011* (2013.01); *G01S 17/42* (2013.01); *G01S 17/89* (2013.01);
(Continued)

(58) Field of Classification Search
CPC .......... G06F 3/011; G01S 17/42; G01S 17/89; G02B 27/017; G02B 27/0179; G02B 2027/0187; G06T 15/10; G06T 17/00
(Continued)

(56) References Cited

U.S. PATENT DOCUMENTS

2016/0290764 A1 10/2016 Chen
2017/0067987 A1 3/2017 Lu
(Continued)

OTHER PUBLICATIONS

English translation of the Written Opinion of the International Searching Authority dated Mar. 30, 2021 for corresponding International Application No. PCT/FR2020/052466, filed Dec. 16, 2020.
(Continued)

*Primary Examiner* — Thai Q Tran
*Assistant Examiner* — Nienru Yang
(74) *Attorney, Agent, or Firm* — David D. Brush; Westman, Champlin & Koehler, P.A.

(57) ABSTRACT

An interaction peripheral, a method for detecting a real point, a virtual reality headset, a method for reproducing a real point in virtual space, a device and a method for virtualising a real space, particularly allowing a plane to be obtained in two, three or n dimensions of a real space which may be reproducible in virtual reality. An interaction peripheral which can be connected to a virtual reality headset, includes a range finder which can supply, to the headset, a measurement signal including a relative position measurement of a real point of a real space, the real point being sighted by the range finder. The measurement signal enables reproduction of the real point measured in a virtual space
(Continued)

generated by the headset. Thus, the real point can be reproduced in real space while reducing risks of errors because the measurement tools are simple interaction peripherals handled by a user.

13 Claims, 7 Drawing Sheets

(51) Int. Cl.
*G01S 17/89* (2020.01)
*G02B 27/01* (2006.01)
*G06T 15/10* (2011.01)
*G06T 17/00* (2006.01)

(52) U.S. Cl.
CPC .......... *G02B 27/0179* (2013.01); *G06T 15/10* (2013.01); *G06T 17/00* (2013.01)

(58) Field of Classification Search
USPC .......................................................... 348/115
See application file for complete search history.

(56) References Cited

U.S. PATENT DOCUMENTS

| | | | | |
|---|---|---|---|---|
| 2017/0184721 | A1 | 6/2017 | Sun et al. | |
| 2017/0337743 | A1 | 11/2017 | Metzler et al. | |
| 2018/0005441 | A1* | 1/2018 | Anderson | G06T 19/006 |
| 2018/0300040 | A1* | 10/2018 | Mate | G06F 3/013 |
| 2018/0361260 | A1* | 12/2018 | Ord | A63F 13/65 |
| 2019/0108578 | A1* | 4/2019 | Spivack | G09B 5/065 |

OTHER PUBLICATIONS

International Search Report dated Mar. 22, 2021 for corresponding International Application No. PCT/FR2020/052466, Dec. 16, 2020.

Written Opinion of the International Searching Authority dated Mar. 22, 2021 for corresponding International Application No. PCT/FR2020/052466, filed Dec. 16, 2020.

Gregg-Smith Austin et al., "Investigating spatial guidance for a cooperative handheld robot", 2016 IEEE International Conference on Robotics and Automation (ICRA), IEEE, May 16, 2016 (May 16, 2016,p. 3367-3374, XP032908535.

European Communication pursuant to Article 94(3) EPC dated Feb. 12, 2024 for corresponding European Application No. 20 845 592.3.

* cited by examiner

Fig. 10a
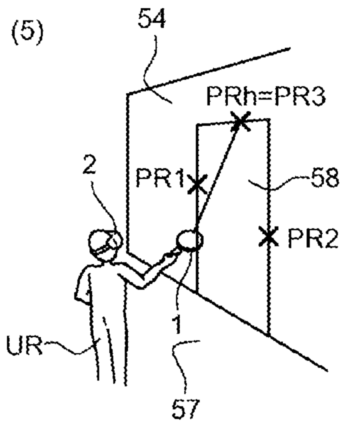
Fig. 10b
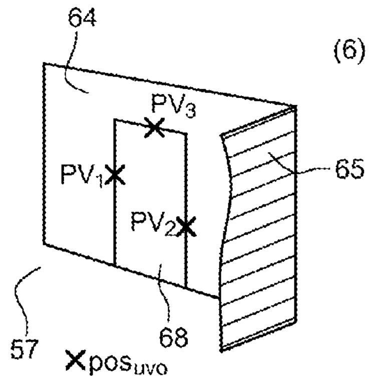
Fig. 11a
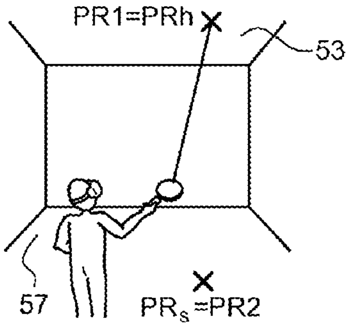
Fig. 11b
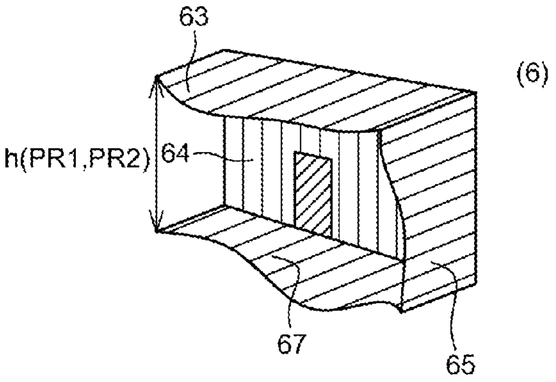
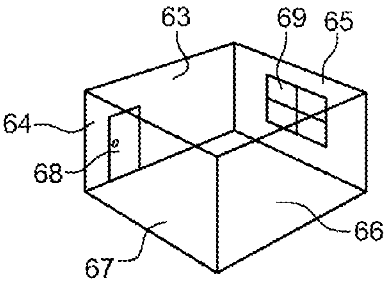
Fig. 12

INTERACTION PERIPHERAL, DETECTION METHOD, VIRTUAL REALITY HEADSET, METHOD FOR REPRODUCING A REAL POINT IN VIRTUAL SPACE, DEVICE AND METHOD FOR VIRTUALIZING A REAL SPACE

CROSS-REFERENCE TO RELATED APPLICATIONS

This Application is a Section 371 National Stage Application of International Application No. PCT/FR2020/052466, filed Dec. 16, 2020, which is incorporated by reference in its entirety and published as WO 2021/123619 A1 on Jun. 24, 2021, not in English.

TECHNICAL FIELD

The invention relates to an interaction peripheral, to a method for surveying a real point, to a virtual reality headset, to a method for reproducing a real point in a virtual space, to a device and to a method for virtualizing a real space. Virtualizing a real space makes it possible in particular to obtain a two-dimensional, three-dimensional or n-dimensional plan of a real space possibly able to be reproduced in virtual reality.

PRIOR ART

In order to generate a three-dimensional representation of a real space, professionals generally use a 3D scanner that makes it possible to scan the room or space to be modeled. However, using such an apparatus requires the apparatus to be calibrated and positioned correctly in the space to be mapped in order to take measurements. In addition, the model obtained from data measured by a 3D scanner is not always optimum, in particular if the space to be modeled contains obstacles, for example in the case of a furnished room. The model then requires manual retouching, which may be tedious and require a certain level of expertise with CAD (for Computer Aided Design) tools. In addition, the cost of a 3D scanner is relatively high.

Another method for generating a three-dimensional representation of a real space is that of using an existing two-dimensional plan, generated manually or else obtained from a file. However, such a method requires specialized skills in the use of modeling software. In addition, the architect's 2D plans, when they are available, are sometimes slightly out of line with the actual implementation.

SUMMARY OF THE INVENTION

One of the aims of the present invention is to rectify drawbacks of the prior art.

One subject of the invention is an interaction peripheral able to be connected to a virtual reality headset, the interaction peripheral comprising a rangefinder able to provide the virtual reality headset with a measurement signal comprising a measurement of the relative position of a real point in a real space, the real point being sighted by the rangefinder, the measurement signal being able to allow reproduction of the measured real point in a virtual space rendered by the virtual reality headset.

The real point may thus be reproduced in the real space while reducing the risks of errors, since the measurement tools are simple interaction peripherals that are easy to manipulate for a user. Furthermore, the measurement by way of a rangefinder fitted to the interaction peripheral allows a more precise measurement, since the measured real point is surveyed for example by way of laser pointing, making it possible to identify the real point to be surveyed more precisely. In addition, the measurement by way of a rangefinder fitted to the interaction peripheral makes it possible to survey a real point in a cluttered space such as a furnished room, a filled storage space, a furnished and/or planted outdoor space, etc. without the need to move bulky objects or the user having to perform acrobatics to survey a real point situated behind one or more items of furniture, and/or one or more boxes, crates, and/or one or more plants, etc.

Advantageously, the interaction peripheral comprises a direction detector able to provide the virtual reality headset with a signal comprising a direction in which the rangefinder measured the real point.

Advantageously, the interaction peripheral comprises a location detector able to provide the virtual reality headset with a signal comprising a position of the interaction peripheral.

Advantageously, the interaction peripheral comprises a controller able to be manipulated by a user wearing the virtual reality headset, the controller activating the rangefinder upon the command of the user.

Advantageously, the interaction peripheral is a portable peripheral.

Another subject of the invention is a method for surveying a real space intended to be integrated into a virtual space, the surveying method being implemented by an interaction peripheral comprising:

- pointing at a real point in the real space by way of the interaction peripheral,
- measuring the relative position of a real point sighted by the interaction peripheral during the pointing, the relative position measurement providing a measurement signal able to make it possible to reproduce the sighted real point in a virtual space rendered by the virtual reality headset.

Another subject of the invention is a virtual reality headset able to be connected to an interaction peripheral, the virtual reality headset comprising a display able to reproduce a virtual point in a virtual space, the virtual point being defined by a relative position of the virtual point in the virtual space based on a measurement signal for a real point sighted by the interaction peripheral in the real space.

Advantageously, the display is able to allow the user wearing the virtual reality headset to see the real space during surveying of a real space by way of the interaction peripheral.

Another subject of the invention is a method for reproducing a real point in a virtual space rendered by a virtual reality headset able to be connected to an interaction peripheral, the reproduction method comprising displaying a virtual point in a virtual space, the virtual point being defined by a relative position of the virtual point in the virtual space based on a measurement signal for a real point sighted by the interaction peripheral in the real space.

One subject of the invention is a device for virtualizing a real point in a virtual space rendered by a virtual reality headset able to be connected to an interaction peripheral, the virtualization device comprising a computer for computing a relative position of a virtual point in the virtual space based on a measurement signal for the real point sighted by the interaction peripheral in a real space, the computer receiving the measurement signal from the interaction peripheral and commanding the display of the virtual point in the virtual space by providing the relative position of the virtual point to the virtual reality headset rendering the virtual space.

Another subject of the invention is a method for virtualizing a real point in a virtual space rendered by a virtual reality headset able to be connected to an interaction peripheral, the virtualization method comprising computing a relative position of a virtual point in the virtual space based on a measurement signal for the real point sighted by the interaction peripheral in a real space, the computing triggering the display of the virtual point in the virtual space by providing the relative position of the virtual point to the virtual reality headset rendering the virtual space.

Another subject of the invention is a device for virtualizing a real area of a real space in a virtual space rendered by a virtual reality headset able to be connected to an interaction peripheral, the real area consisting of at least one real object, the device for virtualizing a real area comprising:

- a real-point virtualization device according to the invention,
- a virtual object generator for generating virtual objects based on the relative positions of multiple virtual points as provided by the real-point virtualization device, the virtual object generator triggering the display of the virtual object in the virtual space by providing at least one dimension of the virtual object and a relative position of the virtual object to the virtual reality headset rendering the virtual space.

Another subject of the invention is a method for virtualizing a real area of a real space in a virtual space rendered by a virtual reality headset able to be connected to an interaction peripheral, the real area consisting of at least one real object, the method for virtualizing a real area comprising:

- a real-point virtualization method according to the invention,
- virtual object generation for generating virtual objects based on the relative positions of multiple virtual points as provided by the real-point virtualization device, the virtual object generation triggering the display of the virtual object in the virtual space by providing at least one dimension of the virtual object and a relative position of the virtual object to the virtual reality headset rendering the virtual space.

Advantageously, the virtualization method comprises repeating the real-point virtualization and virtual object generation steps for multiple objects in the real area, able to make it possible to generate a virtual plan of the real area, the virtual plan consisting of the generated virtual objects.

Advantageously, according to one implementation of the invention, the various steps of a method according to the invention are implemented by software or a computer program, this software comprising software instructions intended to be executed by a data processor of a device forming part of an interaction peripheral and/or a virtual reality headset and/or an equipment of a communication network and being designed to command the execution of the various steps of at least one of these methods.

The invention therefore also targets a program comprising program code instructions for executing the steps of the method for surveying a real space according to the invention and/or a reproduction method according to the invention and/or a method for virtualizing a real point according to the invention or a real area according to the invention when said program is executed by a processor.

This program may use any programming language, and be in the form of source code, object code, or intermediate code between source code and object code, such as in a partially compiled form, or in any other desirable form.

BRIEF DESCRIPTION OF THE DRAWINGS

The features and advantages of the invention will become more clearly apparent upon reading the description, given by way of example, and the related figures, in which:

FIG. 10*a* shows a simplified diagram of a survey of a real door to be virtualized on a virtualized real wall according to the invention, FIG. 10*b* shows a simplified diagram of a reproduction of a virtual wall and a virtual door generated from the surveys of the real door from FIG. 10*a* on the virtual wall according to the invention, FIG. 11*a* shows a simplified diagram of a survey of a ceiling to be virtualized according to the invention, FIG. 11*b* shows a simplified diagram of a reproduction of the ceiling generated from the surveys of the real ceiling from FIG. 11*a* according to the invention, FIG. 12 shows a simplified diagram of a reproduction of a virtual room generated from the surveys of the real room from FIG. 7 according to the invention.

DESCRIPTION OF THE EMBODIMENTS

Figure 1A:
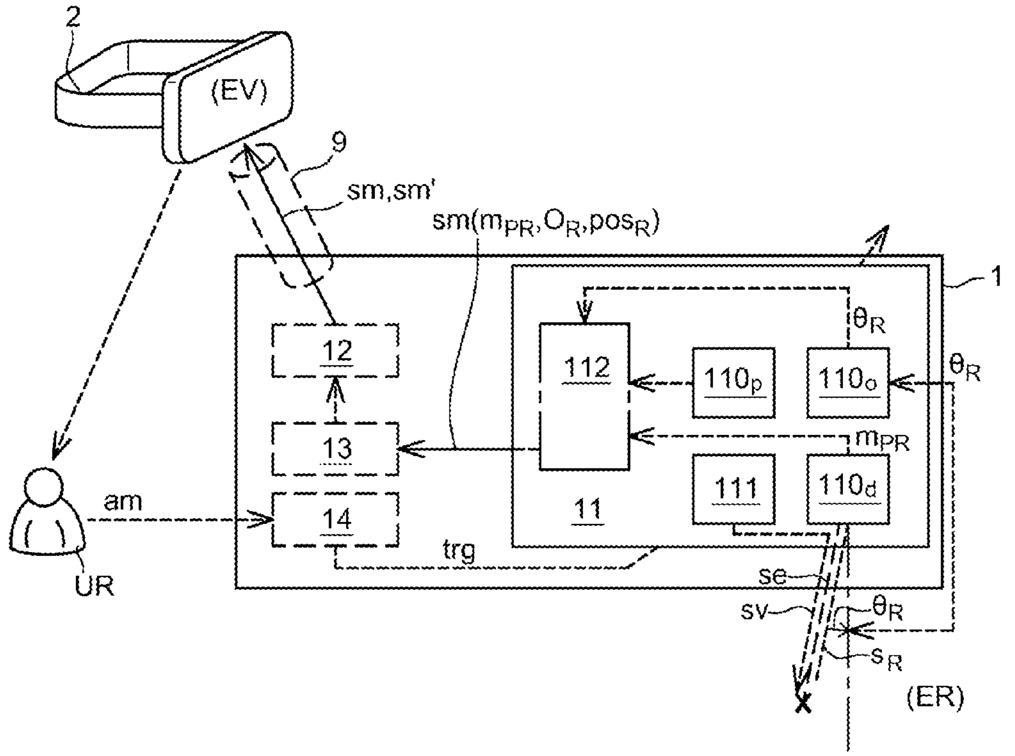
FIG. 1*a* shows a simplified block diagram of an interaction peripheral according to the invention.

FIG. 1*a* illustrates a simplified block diagram of an interaction peripheral according to the invention.

The interaction peripheral 1 is able to be connected to a virtual reality headset 2. The interaction peripheral 1 comprises a rangefinder 11 able to provide the virtual reality headset 2 with a measurement signal sm comprising a measurement $m_{PR}$ of the relative position of a real point PR in a real space ER, the real point PR being sighted by the rangefinder 11. The measurement signal sm is able to allow a reproduction PV of the measured real point in a virtual space EV rendered by the virtual reality headset 2.

In particular, the interaction peripheral 1 comprises a direction detector $\mathbf{110}_\theta$ able to provide the virtual reality headset 2 with a signal sm comprising a direction $\theta_R$ in which the rangefinder 11 measured the real point.

In particular, the interaction peripheral comprises a location detector $\mathbf{110}_p$ able to provide the virtual reality headset with a signal sm comprising a position of the interaction peripheral $pos_R$.

In particular, the interaction peripheral comprises a distance detector $\mathbf{110}_d$ able to provide the virtual reality headset with a signal sm comprising the measurement $m_{PR}$ of the relative position of a real point PR in a real space ER, the real point PR being sighted by the rangefinder 11. The measurement $m_{PR}$ of the relative position of the real point PR is in particular a distance between the real point PR and the rangefinder 11.

In particular, the measurement signal sm comprises, in addition to the measurement $m_{PR}$ of the relative position of a real point PR, one or more of the following data:

a direction $\theta_R$ in which the rangefinder 11 measured the real point, a position of the interaction peripheral $pos_R$.

In particular, the interaction peripheral 1 comprises a controller 14 able to be manipulated by a user UR wearing the virtual reality headset 2. The controller 14 activates trg the rangefinder 11 upon the command am of the user UR.

In particular, the rangefinder 11 comprises a distance detector $\mathbf{110}_d$ able to provide the measurement $m_{PR}$ of the relative position of a real point PR. In particular, the distance detector $\mathbf{110}_d$ transmits a signal se to the sighted real point PR and receives a signal sr corresponding to a reflection of at least part of the transmitted signal se from the real point PR. Thus, depending on the transmission time te of the transmitted signal se and the reception time tr of the reflected signal sr, the distance detector $\mathbf{110}_d$ is able to determine a distance between the rangefinder 11 and the real point PR. The distance determination is performed for example by a computer (not illustrated) of the distance detector $\mathbf{110}_d$.

The distance detector $\mathbf{110}_d$ optionally comprises a generator for generating a transmission signal (not illustrated) able to be at least partially reflected by a real point PR. In particular, the transmission signal generator generates a signal that makes it possible to reduce the delay between the transmission time te and the reception time tr in order to reduce the delay in providing the measurement signal sm to the virtual reality headset 2.

Either the distance detector $\mathbf{110}_d$ uses a transmitter of the interaction peripheral to transmit the transmission signal se to the real point, or the distance detector $\mathbf{110}_d$ comprises a transmitter for transmitting the transmission signal se. Furthermore, either the distance detector $\mathbf{110}_d$ uses a receiver of the interaction peripheral to receive the reflected signal sr from the real point, or the distance detector $\mathbf{110}_d$ comprises a receiver for receiving the reflected signal sr.

In particular, the rangefinder 11 comprises a sight 111 for sighting, that is to say pointing, the rangefinder at the real point PR for which a measurement $m_{PR}$ of its relative position has to be performed by the rangefinder 11.

The sight 111 is in particular a sighting scope implemented in the rangefinder such that the rangefinder 11 performs the measurement $m_{PR}$ of the relative position of the real point PR sighted by the user UR through the sighting scope 111. The sighting scope thus allows the user to sight the real point PR, that is to say to see the real point PR through the sighting scope 111.

As an alternative, the sight 111 is in particular a sighting laser or pointing laser. The sight 111 comprises at least one generator for generating a laser signal (not illustrated) and one emitter (not illustrated) for emitting the generated laser signal, also called sighting signal sv. The user UR thus moves the rangefinder 11, or even the interaction peripheral 1 comprising the rangefinder 11, so that the sighting signal sv points at the real point PR.

In one particular embodiment, the sight 111 is implemented in the distance detector $\mathbf{110}_d$. The sighting signal sv and the transmitted signal se able to be reflected at least partially by the real point PR are possibly one and the same signal.

In particular, the interaction peripheral 1 comprises a real-data virtualization device 13 able to transform the measurement signal sm relating to the real point PR into a measurement signal sm' relating to a virtual point PV based on the measured real point PR.

In particular, the interaction peripheral 1 comprises a transmitter 12 able to transmit a measurement signal to the virtual reality headset 2: either the measurement signal sm relating to the real point PR or the measurement signal sm'relating to the virtual point PV. The virtual reality headset 2 and the interaction peripheral 1 thus communicate via a wireless communication network 9 (Bluetooth™, Wi-Fi™, 4G, 5G, etc.).

As an alternative, the connection between the virtual reality headset 2 and the interaction peripheral 1 is wired. The interaction peripheral then comprises a connector 12 for connecting a wire 9 for connection to the virtual reality headset 2.

The connector 12 is either a USB connector, a micro-USB connector, a fiber connector, an Ethernet™ connector, etc.

Figure 1B:
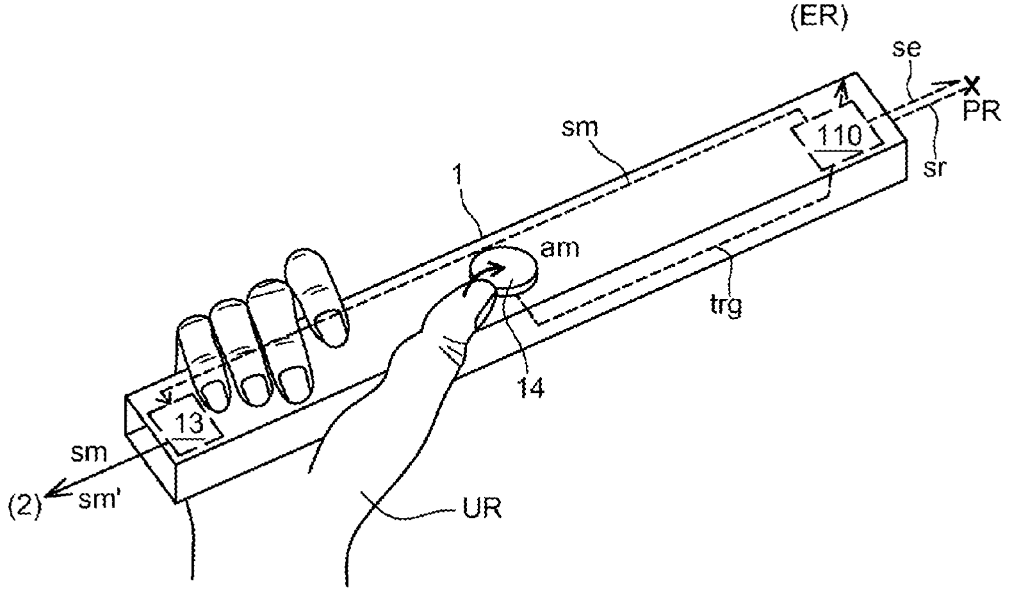
FIG. 1*b* shows a simplified three-dimensional diagram of an interaction peripheral according to the invention.

FIG. 1*b* illustrates a simplified three-dimensional diagram of an interaction peripheral according to the invention.

In particular, the interaction peripheral 1 is a portable peripheral. FIG. 1*b* shows an example of a portable and manipulable interaction peripheral 1.

The user UR holds the interaction peripheral 1 in his hand and points the rangefinder of the interaction peripheral 1 at a real point PR. The rangefinder 11 then provides a measurement signal comprising a measurement $m_{PR}$ of the relative position of the real point PR in a sighted real space ER.

In particular, the rangefinder 11 sends a transmitted signal se in the direction of the real point PR to be measured and receives a reflected signal sr corresponding to a reflection of at least part of the transmitted signal se from the real point PR. The reception of the reflected signal sr allows the rangefinder to determine the measurement $m_{PR}$ of the relative position of the real point PR in a sighted real space ER.

In particular, the interaction peripheral 1 comprises a controller 14. The controller 14 is a human-machine interface for receiving a command am from the user UR. The controller 14 is in particular an input interface, such as a button (see illustration in FIG. 1*b*), a keypad, a touchscreen, etc.; a capture interface (microphone for voice, gesture, etc. control). An action as by the user UR with respect to this controller 14 (pressing the button, a key on the keypad, tapping a predefined portion of the touchscreen, capturing a voice measurement command, predefined gesture—for example fast front-to-rear—without modifying sight) triggers trg activation of the rangefinder, in particular commands a measurement by the rangefinder 11 (for example, triggers the sending of the transmission signal se).

In the example of FIG. 1*b*, the interaction peripheral 1 comprises a transmitter 12 sending the measurement signal sm to the virtual reality headset 2 worn by the user UR.

Figure 2A:
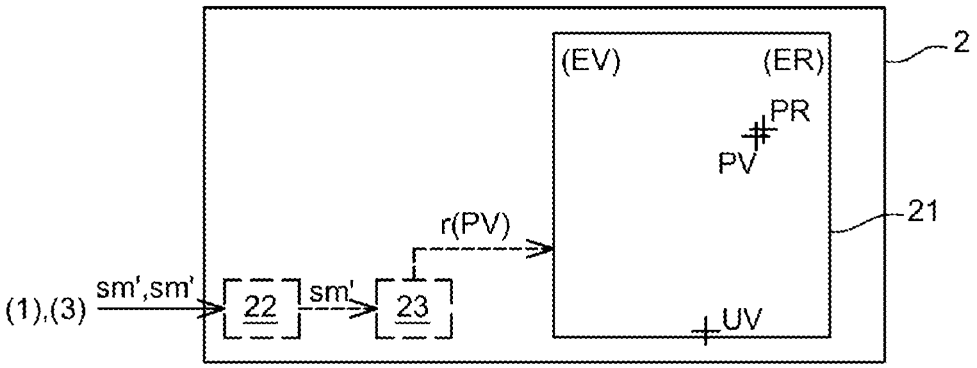
FIG. 2*a* shows a simplified block diagram of a virtual reality headset according to the invention.

FIG. 2*a* illustrates a simplified block diagram of a virtual reality headset according to the invention.

The virtual reality headset 2 is able to be connected to an interaction peripheral 1. The virtual reality headset 2 comprises a display 21 able to reproduce a virtual point PV in a virtual space EV. The virtual point PV is defined by a relative position of the virtual point $posr_{PV}$ in the virtual space EV based on a measurement signal sm for a real point PR sighted by the interaction peripheral 1 in the real space ER.

In particular, the display 21 is able to allow the user UR wearing the virtual reality headset 2 to see the real space ER during surveying of a real space ER by way of the interaction peripheral 1. The virtual reality headset 2 is thus an augmented reality headset for displaying the virtual point PV in a manner superimposed on the real point PR in the real space ER visible to the user UR through the display 21 of the virtual reality headset 2.

In particular, the virtual reality headset 2 comprises a receiver 22 for receiving a measurement signal sm, sm' from the interaction peripheral 1. The received measurement signal is either a measurement signal sm relating to the real point PR or a measurement signal sm' relating to a virtual point PV based on the measured real point PR.

The virtual reality headset 2 optionally comprises a real-data virtualization device 23 able to transform the measurement signal sm relating to the real point PR into a measurement signal sm' relating to a virtual point PV based on the measured real point PR, or even into a display signal for a virtual point r(PV). The display signal for a virtual point r(PV) commands the display of the virtual point PV on the display 21.

As an alternative, the virtual reality headset 2 receives a measurement signal sm' relating to a virtual point PV based on the measured real point PR either directly from the interaction peripheral 2 or from a virtualization device 3.

The point UV represents a virtual representation of the situation in the virtual space EV of the real user UR.

Figure 2B:
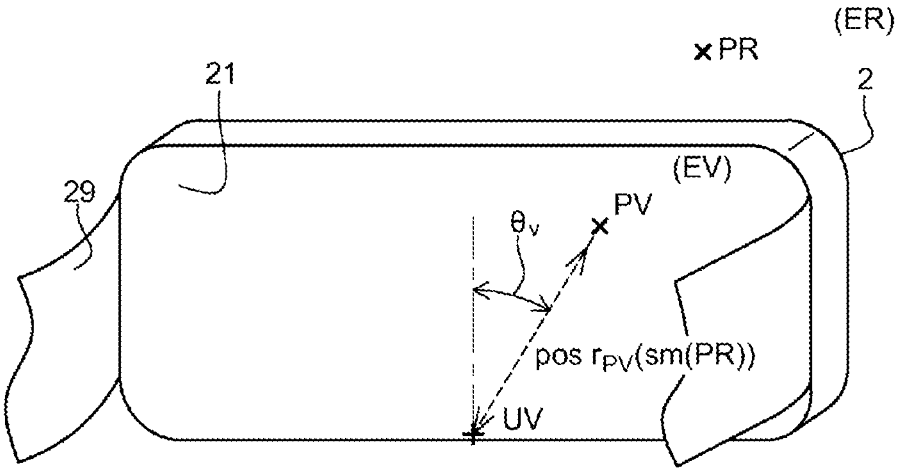
FIG. 2*b* shows a simplified three-dimensional diagram of a virtual reality headset according to the invention.

FIG. 2*b* illustrates a simplified three-dimensional diagram of a virtual reality headset according to the invention.

The virtual reality headset 2 is in particular a mask with a display 21 able to be placed in front of the eyes of the user UR when said user is wearing the virtual reality headset 2. The mask is equipped with a headband 29 for holding the virtual reality headset 2 on the user's head with the mask 21 placed in front of the eyes of the real user UR.

FIG. 2*b* shows that the virtual point PV representing the real point PR in the virtual space EV displayed by the display 21 is positioned relative to the virtual user UV corresponding to the real user UR based on the measurement signal comprising the relative position of the real point PR: $posr_{PV}$(sm(PR)). The virtual point PV displayed by the display is possibly positioned in a virtual direction $\theta_V$ based on a direction $\theta_R$ of the measurement of the real point PR.

Figure 3:
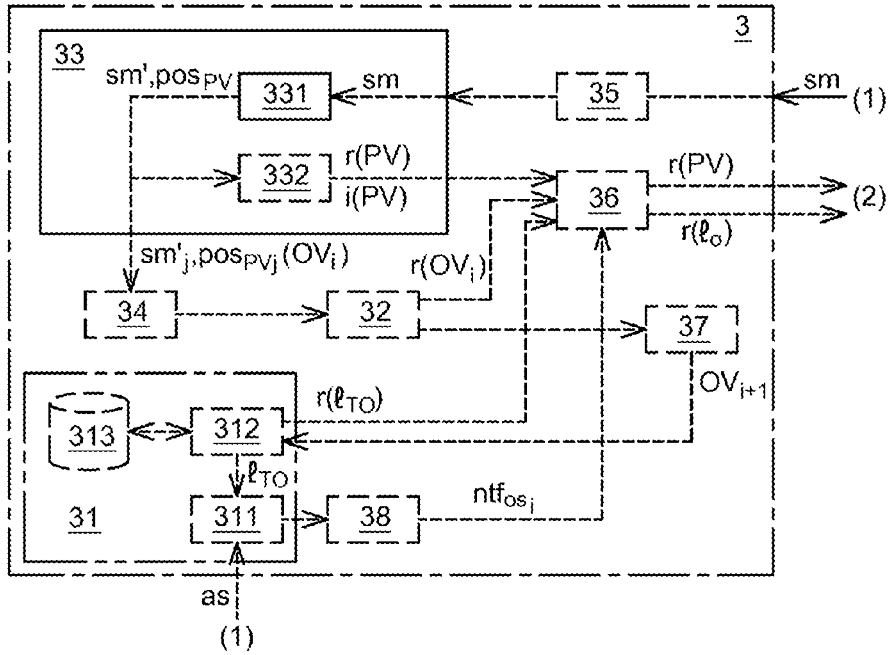
FIG. 3 shows a simplified block diagram of a device for virtualizing a real space according to the invention.

FIG. 3 illustrates a simplified block diagram of a device for virtualizing a real space according to the invention.

The device 33 for virtualizing a real point PR in a virtual space EV rendered by a virtual reality headset 2 able to be connected to an interaction peripheral 1. The virtualization device 33 comprises a computer 331 for computing a relative position of a virtual point $pos_{PV}$ in the virtual space EV based on a measurement signal sm for the real point PR sighted by the interaction peripheral 1 in a real space ER. The computer 331 receives the measurement signal sm from the interaction peripheral 1 and commands the display of the virtual point PV in the virtual space EV by providing the relative position of the virtual point $pos_{PV}$ to the virtual reality headset 2 rendering the virtual space EV.

In particular, the computer 331 provides a measurement signal sm' for the virtual point comprising the relative position of the virtual point $pos_{PV}$ and optionally a virtual direction $\theta_V$ based on a real direction of sight $\theta_R$ of the real point PR and/or the virtual location UV of the virtual user or of the virtual rangefinder based on a real location of the real user UR or of the real rangefinder.

In particular, the device 33 for virtualizing a real point comprises an image reproducer able to transform the measurement signal sm'relating to the virtual point PV based on the measured real point PR into a display signal for the virtual point r(PV).

The invention optionally proposes a device 3 for virtualizing a real area of a real space ER in a virtual space EV rendered by a virtual reality headset 2 able to be connected to an interaction peripheral 1. The real area consists of at least one real object OR. The device 3 for virtualizing a real area comprises:

- a real-point virtualization device 33, and
- a virtual object generator 34 for generating virtual objects based on the relative positions of multiple virtual points $pos_{PVj}$(OVi) as provided by the real-point virtualization device 33.

The virtual object generator 34 triggers the display of the virtual object OVi in the virtual space EV by providing at least one dimension of the virtual object $dim(OV_i)$ and a relative position of the virtual object $posr_{OVi}$ to the virtual reality headset 2 rendering the virtual space EV.

In particular, the device 3 for virtualizing a real area comprises an object type selector 31 for selecting an object type from a list of object types to be virtualized ITO. The object type selector 31 receives, from the interaction peripheral 1, a selection command as for selecting an object type OTS from the list of object types to be virtualized $I_{TO}$ based on a real object OR in the real area.

In particular, the object type selector 31 comprises an object type base 313 storing the list of object types $I_{TO}$. An object stored in the object type base 313 has one or more associated dimensions, and/or one or more points for determining the object. An object type has at least one corresponding descriptive parameter that makes it possible, by taking distinct values, to describe multiple distinct objects of the same type. An object type is understood in particular to mean an object shape (cube, parallelepiped, cylinder, sphere, etc.), object category (wall, door, window, socket, etc. and/or rectangular table, round table, chair, crate, etc.), etc.

Optionally, such object types may also be defined by at least one point and one or more dimensions constituting descriptive parameters. For example, the door and/or the window will be defined by two dimensions, such as a height and a width, and a predefined reference point (for example the bottom left corner).

In particular, the device 3 for virtualizing a real area comprises a surveying assistant 38 able to generate, based on a real object OR to be virtualized, at least one survey notification $ntf_{OSi}$ for a real point of the real object intended to be displayed by the virtual reality headset 2. In particular, the real object OR to be virtualized is defined by a selected object type OTSi provided by the object type selector 31. In this case, the virtual object generator 34 generates a virtual object OVi based on the relative positions of the virtual points as provided by the real-point virtualization device 33 according to the survey notifications generated by the assistant 38 based on the selected object type corresponding to the real object to be virtualized.

In particular, the virtualization device 3 comprises a receiver 35 for receiving a measurement signal sm. The measurement signal sm provided by the interaction peripheral 1 comprises at least one relative position of the real point PR sighted by the interaction peripheral 1.

Either the virtualization device 3 provides simple virtualization of the real point PR. The virtualization device 3 then comprises a computer 331 transforming the measurement signal sm relating to the real point PR into a measurement signal sm' relating to a virtual point PV and/or the measurement $m_{PR}$ of the relative position of the real point $posr_{PR}$ into a relative position of a virtual point $posr_{PV}$.

In particular, the computer 331 transforms a direction $\theta_R$ of sight when measuring the real point PR into a virtual direction $\theta_V$. The virtual direction $\theta_V$ is integrated into the measurement signal sm'for the virtual point PV.

In particular, the computer 331 transforms the location of the sighted point or measurement point $pos_R$ (that is to say the location of the rangefinder) into a virtual location of the measurement point $pos_V$. The virtual location of the measurement point $pos_V$ is integrated into the measurement signal sm'for the virtual point PV.

The virtualization device 3 optionally comprises an image generator 332 generating an image of the virtual point PV thus computed. The image generator 332 provides either an image signal for the virtual point i(PV) or, directly, a reproduction signal r(PV) for the virtual point PV to be displayed.

In particular, the virtualization device 3 comprises a transmitter 36 for transmitting the image signal for the virtual point i(PV) or the reproduction signal r(PV) for the virtual point to the virtual reality headset 2.

Or the virtualization device 3 provides virtualization of a real object OR. The virtualization device 3 then comprises a computer 331 transforming the measurement signal sm relating to a real point PR into a measurement signal sm' relating to a virtual point PV and/or the measurement $m_{PR}$ of the relative position of the real point $posr_{PR}$ into a relative position of a virtual point $posr_{PV}$.

In particular, the computer 331 transforms the location of the sighted point or measurement point $pos_R$ (that is to say the location of the rangefinder) into a virtual location of the measurement point $pos_V$.

The virtual location of the measurement point $pos_V$ is integrated into the measurement signal sm'for the virtual point PV.

The virtualization device 3 optionally comprises an object generator 34 generating a virtual object PV from multiple virtual points $PV_{j,\ j=1\ \ldots\ J}$ determined by way of the computer 331 based on multiple real points $PR_{j,\ j=1\ \ldots\ J}$ sighted successively by the interaction peripheral 1. For example, the computer 331 provides multiple relative positions of virtual points $pos_{PVj}(OVi)_{,j=1\ \ldots\ J}$ and/or multiple measurement signals $sm'_{j,\ j=1\ \ldots\ J}$ to form a virtual object OVi. The object generator OVi provides a measurement signal for the virtual object $sm'_{OVi}$, that is to say a signal for relative virtual positions defining the virtual object OVi.

The virtualization device 3 optionally comprises an object image generator 32 generating an image of a virtual object OVi thus generated. The image generator 32 provides either an image signal for the virtual object i(OVi) or, directly, a reproduction signal r(OVi) for the virtual object OVi to be displayed.

In particular, the virtualization device 3 comprises a transmitter 36 for transmitting the image signal i(OVi) for the virtual object or the reproduction signal r(OVi) for the virtual object to the virtual reality headset 2.

In particular, the virtualization device 3 comprises an object type selector 31 for indicating, prior to the measurements of real points, the object type to which these measurements correspond.

For example, the object type selector 31 provides a list of object types $I_{TO}$ to the virtual reality headset 2. In particular, the list of object types is read by the object type selector 31 from an object type base 313. In particular, the object type selector 31 comprises the object type base 313. The object type selector 31 optionally furthermore comprises a selection interface 312 providing either an image of the list of object types $i(I_{To})$ or a reproduction signal for the list of object types $r(I_{To})$ to the virtual reality headset 2, in particular via the transmitter 36.

For example, the object type selector 31 receives an indication relating to the measured real object from the interaction peripheral 1. In particular, a selection action as by the user UR is transmitted, by the interaction peripheral 1, to the virtualization device 3, and in particular to the selector 31. In particular, the selector 31 comprises a selection input interface 311 able to receive the selection action as and to determine the object type from the list $I_{To}$ to which the selection action as corresponds, that is to say the selected object type OTS.

In particular, the selected object type OTSi is used by the virtualization device 3 to generate the virtual object OVi.

In particular, the virtualization device 3 comprises a surveying assistant 38 able to guide the surveys of a real object OR by a user UR by way of an interaction peripheral 1. In particular, the surveying assistant 38 knows the type of real object OR for which the user UR performs a survey by way of the object type selector 31. The surveying assistant 38 in particular guides the surveys by notifying $ntf_{OSi}$ the user UR of the operations to be performed by way of the interaction peripheral 1 to perform the surveys needed to generate the virtual object corresponding to the real object to be virtualized, possibly based on a selected object type OTS provided by the selector 31 defining the type of the real object OR.

In particular, the survey guidance notification $ntf_{OSi}$ is transmitted by the virtualization device 3, by way of a transmitter 36, to the virtual reality headset 2 to be displayed and read by the user UR.

In particular, the virtualization device 3 comprises a generator 37 for generating a virtual area consisting of multiple virtual objects virtualizing a real area consisting of multiple real objects. In particular, the virtual area generator 37 triggers the virtualization of an additional object, as long as all of the objects forming the real area have not been virtualized. For example, the virtual area generator 37 triggers the selector 31 for a new object $OV_{i+1}$.

Figure 4:
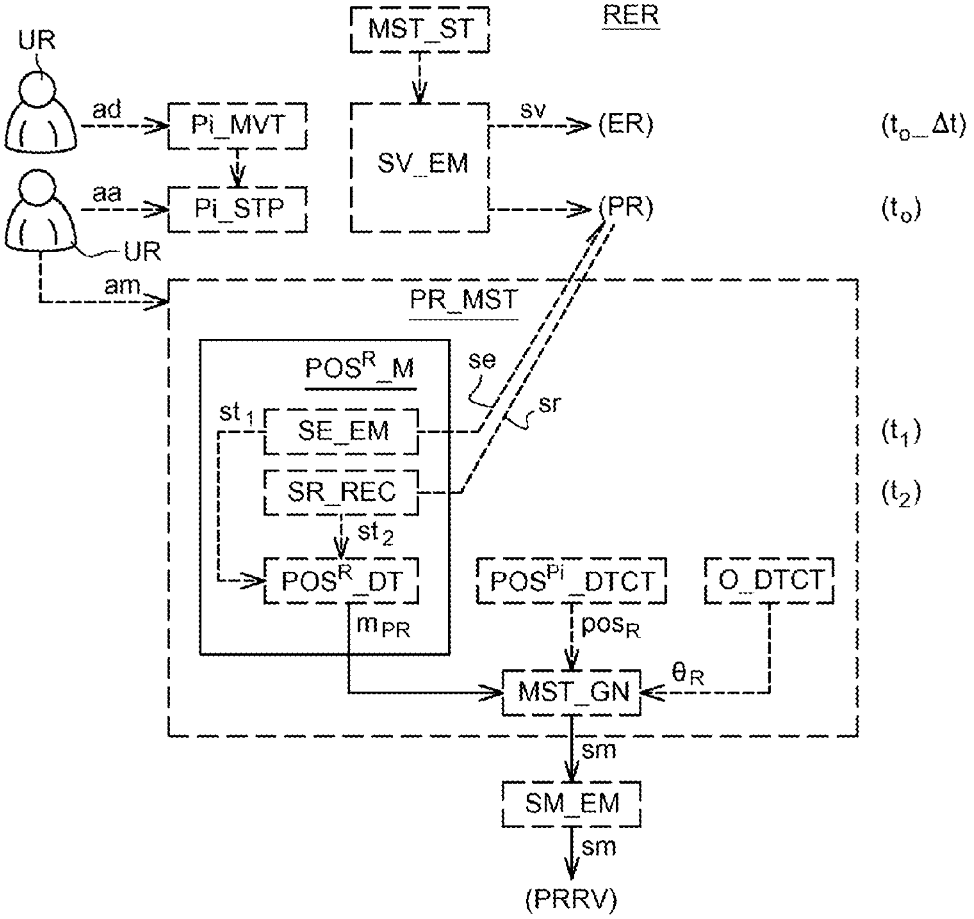
FIG. 4 shows a simplified block diagram of a method for surveying a real point according to the invention.

FIG. 4 illustrates a simplified block diagram of a device for surveying a real point according to the invention.

The method for surveying RER a real space ER intended to be integrated into a virtual space EV is implemented by an interaction peripheral 1. The surveying method RER comprises:

- pointing at a real point PR in the real space ER by way of the interaction peripheral 1,
- measuring $POS^R\_M$ the relative position of a real point PR sighted by the interaction peripheral 1 during the pointing, the relative position measurement $POS^R\_M$ providing a measurement signal sm able to make it possible to reproduce the sighted real point PR in a virtual space EV rendered by the virtual reality headset 2.

In particular, the measurement signal sm provided by the measurement $POS^R$_M of the relative position of the real point PR comprises a measured relative position $m_{PR}$ of the real point PR.

In particular, the surveying method RER comprises launching MST_ST the surveying method, triggering in particular the startup of a rangefinder of the interaction peripheral 1. The launching of the surveying method MST_ST optionally triggers or commands the startup of a sight 111.

In particular, the launching of the surveying method MST_ST triggers or commands transmission SV_EM of a sighting signal sv into the real space ER by the interaction peripheral 1.

In particular, a user UR manipulates the interaction peripheral 1 transmitting the sighting signal sv. The user UR commands ad in particular a movement PI_MVT of the interaction peripheral, thus displacing the sighting signal toward a real point PR to be surveyed, for example starting from a time $t_0$-Δt.

In particular, when the sighting signal sv points at the real point PR to be surveyed, the user UR commands aa stoppage PI_STP of the movement of the interaction peripheral, for example at a time $t_0$.

In particular, the pointing comprises transmitting the sighting signal SV_EM when this signal is pointing at the real point PR to be surveyed.

In particular, when the interaction peripheral 1, in particular the rangefinder 11 of the interaction peripheral, sights the real point PR, the user triggers the measurement $POS^R$_M of the relative position of a real point PR sighted by the interaction peripheral 1. For example, when the interaction peripheral 1 sights the real point PR, the user triggers a measurement PR_MST of the real point PR to be surveyed, sighted by the interaction peripheral 1, the measurement PR_MST of the real point PR comprising in particular the measurement $POS^R$_M of the relative position of a real point PR sighted by the interaction peripheral 1.

In particular, the measurement $POS^R$_M of the relative position of a real point PR sighted by the interaction peripheral 1 comprises transmitting SE_EM a transmission signal se to the real point PR. The transmission signal se is for example a signal able to be reflected at least partially by a real point PR. The transmission SE_EM is in particular performed at a time $t_1$ later than or equal to the time $t_0$ of stopping the movement of the interaction peripheral PI_STP.

In particular, the measurement $POS^R$_M of the relative position of a real point PR sighted by the interaction peripheral 1 comprises receiving SR_REC a signal sr from the real point PR. In particular, following the transmission SE_EM of the transmission signal se to the real point PR, the received signal sr corresponding to part of the transmission signal se is reflected by the real point PR. The reception of the signal SR_REC is performed in particular at a time $t_2$ later than or equal to the time $t_0$ of stopping the movement of the interaction peripheral PI_STP, or even later than or equal to the time $t_1$ of transmission of the transmission signal SE_EM to the real point PR.

In particular, the measurement $POS^R$_M of the relative position of a real point PR sighted by the interaction peripheral 1 comprises determining $POS^R$_DT the relative position of the real point PR providing the measurement signal sm, in particular the measured relative position of the real point $m_{PR}$. In particular, the determination $POS^R$_DT of the relative position of the real point PR performs a computation based on the transmission SE_EM of the transmission signal se to the real point PR and/or the reception SR_REC of a signal sr from the real point PR. For example, the determination $POS^R$_DT of the relative position of the real point PR is based on an emission time datum $st_1$ and a reception time datum $st_2$.

In particular, the measurement PR_MST of the real point PR to be surveyed furthermore comprises a direction detection θ_DTCT, providing a direction of the real point to be surveyed $\theta_R$.

In particular, the measurement PR_MST of the real point PR to be surveyed furthermore comprises a location detection $POS^{IP}$_DTCT, providing a location $pos_R$ of the interaction peripheral, or even of the rangefinder of the interaction peripheral, when surveying the real point PR.

In particular, the measurement PR_MST of the real point PR to be surveyed furthermore comprises a measurement signal generator MST_GN integrating, into a measurement signal sm, one or more measurement data, such as the measured relative position of the real point $m_{PR}$ and/or the direction of the real point to be surveyed $\theta_R$ and/or the location $pos_{IP}$ of the interaction peripheral when surveying the real point PR.

In particular, the surveying method RER comprises transmitting the measurement signal SM_EM to the virtual reality headset. In particular, the transmission of the measurement signal SM_EM transmits the measurement signal sm to a method for reproducing PRRV the surveyed real point PR in a virtual space.

One particular embodiment of the surveying method RER is a program comprising program code instructions for executing the steps of the method for surveying a real space when said program is executed by a processor.

Figure 5:
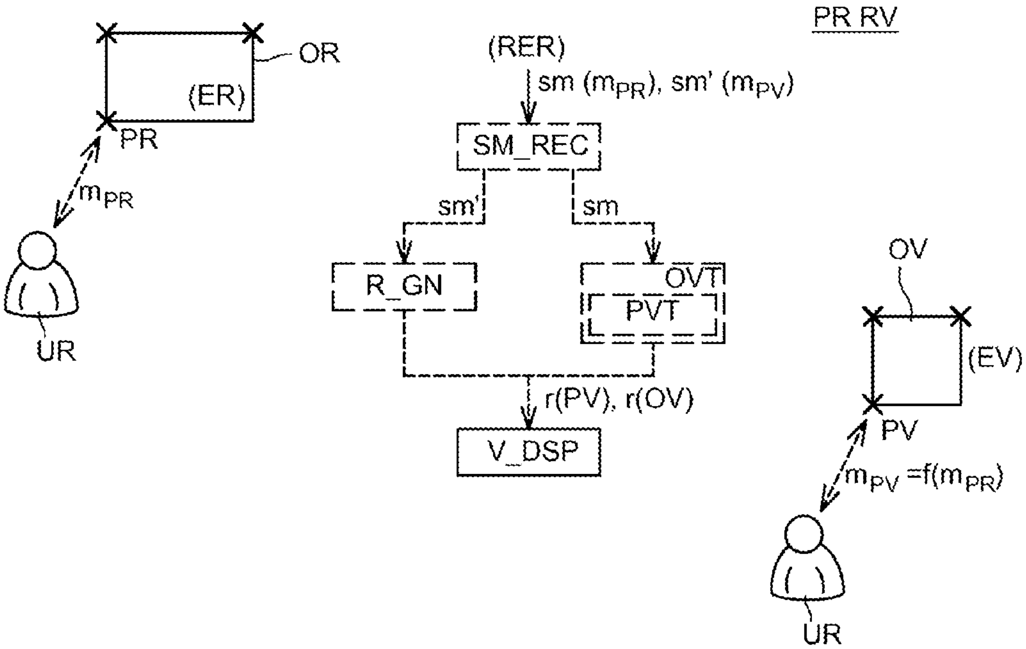
FIG. 5 shows a simplified block diagram of a method for virtually reproducing a real point in a virtual space according to the invention.

FIG. 5 illustrates a simplified block diagram of a method for virtually reproducing a real point in a virtual space according to the invention.

The method for reproducing PRRV a real point PR in a virtual space EV rendered by a virtual reality headset 2 able to be connected to an interaction peripheral 1 comprises displaying V_DSP a virtual point PV in a virtual space EV. The virtual point PV is defined by a relative position $m_{PV}$ of the virtual point PV in the virtual space EV based on a measurement signal sm for a real point PR sighted by the interaction peripheral 1 in the real space ER.

In particular, the reproduction method PRRV comprises receiving SM_REC a measurement signal sm from a survey of a real point RER. The measurement signal sm received by the reception SM_REC is either a measurement signal sm for the real point PR or a measurement signal sm' relating to a virtual point PV corresponding to a virtualization of the surveyed real point PR. The measurement signal sm for the real point PR comprises for example a relative position $m_{PR}$ of the real point PR in the real space ER. The measurement signal sm'for the virtual point PV comprises for example a relative position $m_{PV}$ of the virtual point PV in the virtual space EV.

In particular, the reproduction method PRRV comprises an image generation R_GN generating a reproduction signal r(PV) for the virtual point based on the received measurement signal sm' relating to the virtual point PV.

In particular, the reproduction method PRRV comprises virtualizing PVT the surveyed real point PR based on the received measurement signal sm. In particular, the virtualization PVT of the surveyed real point PR comprises an image generation R_GN generating a reproduction signal r(PV) for the virtual point based on the measurement signal sm' relating to the virtual point PV and provided by the virtualization PVT.

In particular, the reproduction method PRRV comprises virtualizing OVT a surveyed real object OR based on received measurement signals sm providing at least relative position measurements $m_{PR}$ for the surveyed real points. The surveyed real object OR comprises at least the surveyed real point PR. In particular, the virtualization OVT of the surveyed real object OR comprises an image generation R_GN generating a reproduction signal r(OV) for the virtual object based on measurement signals sm'relating to the virtual points PV and provided by the object virtualization OVT.

In particular, the virtualization OVT of a surveyed real object OR comprises at least one virtualization PVT of a real point for the surveyed real points PR forming the real object OR.

One particular embodiment of the reproduction method PRRV is a program comprising program code instructions for executing the steps of the reproduction method when said program is executed by a processor.

Figure 6:
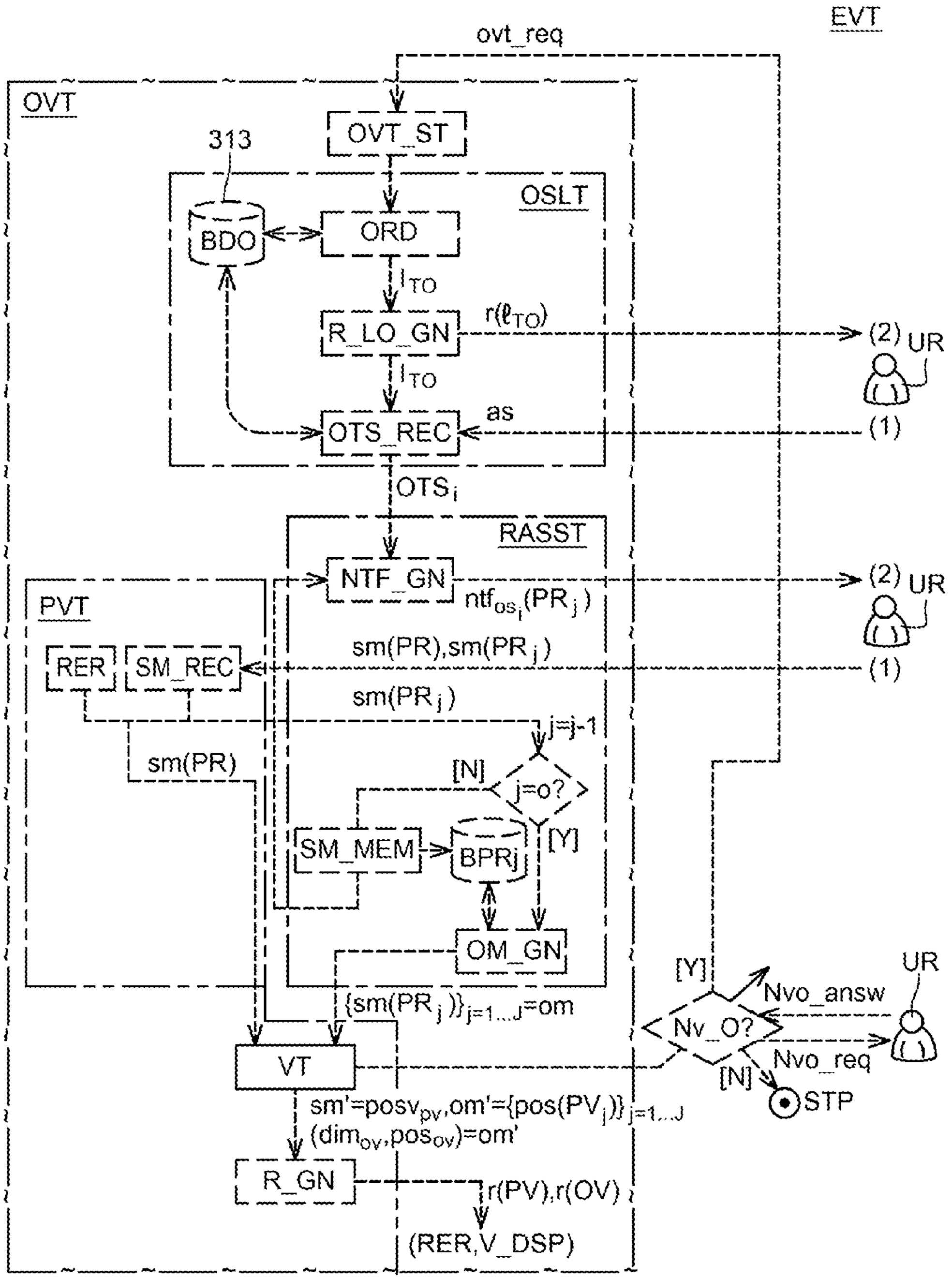
FIG. 6 shows a simplified block diagram of a method for virtualizing at least one element in a real space according to the invention.

FIG. 6 illustrates a simplified block diagram of a method for virtualizing at least one element, a real point and/or one or more real objects, in a real space according to the invention.

The method for virtualizing PVT a real point in a virtual space rendered by a virtual reality headset 2 able to be connected to an interaction peripheral 1 comprises computing VT a relative position $pos_{PV}$ of a virtual point PV in the virtual space EV based on a measurement signal sm(PR) for the real point sighted by the interaction peripheral 1 in a real space ER. The computation VT triggers the display V_DSP of the virtual point PV in the virtual space EV by providing the relative position $pos_{PV}$ of the virtual point to the virtual reality headset 2 rendering the virtual space.

In particular, the computation VT triggers the reproduction PRRV of the virtual point PV in the virtual space EV by providing the relative position $pos_{PV}$ of the virtual point to the virtual reality headset 2 rendering the virtual space. In particular, the relative position $pos_{PV}$, also referenced $m_{PV}$ in FIG. 5, of the virtual point is provided by the real-point virtualization method PVT to the virtual-point reproduction PRRV in a measurement signal sm'relating to the virtual point.

In particular, the method for virtualizing PVT a real point comprises receiving SM_REC a measurement signal relating to the surveyed real point sm(PR).

In particular, the method for virtualizing PVT a real point is implemented by the interaction peripheral 1. The virtualization method PVT then comprises in particular the surveying method RER providing the measurement signal sm(PR) relating to the real point. One example of a surveying method RER implemented by the virtualization method PVT is illustrated in FIG. 4.

In particular, the method for virtualizing PVT a real point comprises an image generation R_GN generating a reproduction signal r(PV) for the virtual point based on the computed measurement signal sm' relating to the virtual point PV.

The method for virtualizing a real area EVT of a real space in a virtual space rendered by a virtual reality headset 2 able to be connected to an interaction peripheral 1 may be implemented either by a virtualization device 3 distinct from the interaction peripheral 1 and from the virtual reality headset 2 or by the interaction peripheral 1 or by the virtual reality headset. The real area consists of at least one real object defined by multiple real points PR.

The method for virtualizing a real area EVT comprises:

a real-point virtualization method PVT, and virtual object generation VT for generating virtual objects based on the relative positions of multiple virtual points as provided by the real-point virtualization method PVT.

The virtual object generation VT triggers the display of the virtual object V_DSP in the virtual space EV by providing at least one dimension of the virtual object $dim_{OV}$ and a relative position of the virtual object $pos_{OV}$ to the virtual reality headset 2 rendering the virtual space.

In particular, the method for virtualizing a real area EVT comprises real object virtualization OVT, repeated the same number of times as the real area comprises real objects ORi to be surveyed.

In particular, the real object virtualization comprises starting a virtualization of a real object OVT_ST. The starting of the object virtualization is in particular triggered (not illustrated) by the starting MST_ST of the surveying method RER.

A dimension of the virtual object OV is in particular understood to mean either a distance in a given direction (such as width, length, height, depth) starting from the relative position of the virtual object forming a reference point of the virtual object OV (bottom front left point, top rear right point, etc.) or the relative positions of virtual points of a set of two virtual points {pos(PV1), pos(PV2)}, etc.

In particular, the method for virtualizing a real area EVT comprises, for each real point PRj of the real object ORi, receiving SM_REC a measurement signal relating to the surveyed real point sm(PRj).

In particular, the method for virtualizing a real area EVT is implemented by the interaction peripheral 1. The method for virtualizing a real area EVT then comprises in particular the surveying method RER providing the measurement signal sm(PRj) relating to the real point PRj. One example of a surveying method RER implemented by the method for virtualizing a real area EVT is illustrated in FIG. 4.

This surveying step RER or measurement signal reception step SM_REC is repeated for various real points PRj, j=1 . . . J of the real object OR to be surveyed. For example, the virtual object generation OVT comprises a check for the iteration j=0? on the real points PRj to be surveyed. In our example, the virtual object generation OVT first retrieves the measurement signal for the real point PRj=J, then PRj=J-1, etc. by decrementing the index j=j-1 until the last real point to be surveyed PR1 of the object ORi.

For as long as the last real point PR1 has not been surveyed [N], the method for virtualizing a real area EVT possibly comprises storing the measurement signal SM_MEM relating to the last surveyed real point sm(PRj) and reiterates, respectively, the surveying RER or the measurement signal reception for another real point $PR_{j-1}$ of the real object OR.

When the last real point PR1 has been surveyed [Y], the method for virtualizing a real area EVT comprises in particular generating OM_GN a measurement signal relating to the surveyed real object om, consisting for example of the set $\{sm(PRj)\}_{j=1 \ldots J}$ of measurement signals relating to the surveyed real points PRj forming the real object ORi.

In particular, the method for virtualizing a real area EVT comprises a measurement computation VT for the virtual object OV in the virtual space EV based on the measurement signal for the surveyed real object om in the real space ER. The measurement computation VT then provides a measurement om' of the virtual object consisting in particular of a set of measurements of virtual points $\{sm'(PRj)\}_{j=1 \ldots J}$ determined based on the measurements of the real points $\{sm(PRj)\}_{j=1 \ldots J}$ defining the surveyed real object ORi. In particular, the measurement om' comprises a dimension $dim_{OV}$ of the virtual object OVi and a relative position of the virtual object $pos_{OV}$.

In particular, the method for virtualizing a real area EVT comprises an image generation R_GN generating a reproduction signal r(PV) for the virtual object based on the computed measurement signal om' relating to the virtual object OV.

In particular, the method for virtualizing a real area EVT comprises an object type selection OSLT from a list of object types to be virtualized ITO. The object type selection OSLT receives a selection command as from the interaction peripheral 1 for selecting an object OTSi from the list of object types ITO to be virtualized based on a real object OR in the real area.

For example, the object type selection OSLT provides a list of object types $I_o$ to an object list image generator. In particular, the list of object types is read by the object type selector 31 from an object type base 313. In particular, the object type selector 31 comprises the object type base 313. The object type selector 31 optionally furthermore comprises a selection interface 312 providing either an image of the list of object types $i(I_o)$ or a reproduction signal for the list of object types $r(I_o)$ to the virtual reality headset 2, in particular via the transmitter 36.

For example, the object type selector 31 receives an indication relating to the measured real object from the interaction peripheral 1. In particular, a selection action as by the user UR is transmitted, by the interaction peripheral 1, to the virtualization device 3, and in particular to the selector 31. In particular, the selector 31 comprises a selection input interface 311 able to receive the selection action as and to determine the object from the list $I_o$ to which the selection action as corresponds, that is to say the selected object type OTS.

In particular, the selected object type OTS is used by the method for virtualizing a real area EVT to generate the virtual object OVi.

In particular, the object type selection OSLT comprises reading ORD a list of object types $I_{TO}$, for example from an object type base BDO, 313.

In particular, the object type selection OSLT comprises generating R_LO_GN a reproduction signal for the read list of object types $r(I_{TO})$. The reproduction signal for the read list of object types $r(I_{TO})$ is provided by the generation of an object list reproduction signal R_LO-GN to the virtual reality headset 2, in particular to a display step implemented by the virtual reality headset 2. The reproduction signal for the read list of object types $r(I_{TO})$ is optionally an interactive signal, that is to say a signal allowing interaction with a displayed element of the list of object types $I_{TO}$ displayed by the virtual reality headset 2.

The user UR wearing the virtual reality headset 2 uses the interaction peripheral 1 to command as a selection of an object from the list of object types $I_{TO}$. For example, the interaction peripheral 1 makes it possible to interact directly with an object Oi from the list of object types displayed ITO by the virtual reality headset 2.

In particular, the object type selection OSLT comprises receiving an object type selection OTS_REC from the interaction peripheral 1, in particular in the form of a selection command as for selecting an object type OTSi from the list of object types hp to be virtualized based on a real object OR in the real area.

In particular, the reception of the object type selection OTS_REC retrieves object descriptive parameters based on the selected object type OTSi. The descriptive parameters of the selected object type are in particular retrieved from an object type base BDO in which the list of object types is stored. The descriptive parameters of object types are for example one or more dimensions, and/or one or more points for determining the object.

In particular, the method for virtualizing a real area EVT comprises surveying assistance RASST able to guide the surveys of a real object OR by a user UR by way of an interaction peripheral 1. In particular, the surveying assistance RASST knows the type of real object OR for which the user UR is performing a survey through the object type selection OTSLT. The surveying assistance RASST in particular guides the surveys by notifying $ntf_{OSi}$ the user UR of the operations to be performed by way of the interaction peripheral 1 to perform the surveys needed to generate the virtual object corresponding to the real object to be virtualized, possibly based on a selected object OTS provided by the selector 31 defining the type of the real object OR.

In particular, the survey guidance notification $ntf_{OSi}$ is generated NFT_GN and then transmitted, by the method for virtualizing a real area EVT, to the virtual reality headset 2 to be displayed and read by the user UR.

In particular, the surveying assistance RASST comprises generating NTF_GN a survey guidance notification. If an object type OTSi has been selected beforehand from an object list, the generated notification $ntf_{OSi}$ is possibly based on descriptive parameters of the selected object type OTSi.

The assistance RASST thus provides the generated notification $ntf_{OSi}$ to the virtual reality headset 2 to be displayed to the user UR. Based on the notification $ntf_{OSi}$ displayed by the virtual reality headset 2, the user UR triggers a survey RER of a first real point OR1 of a real object of the first selected object type OTS1. In particular, the interaction peripheral 1 then provides a measurement signal relating to the first real point sm(PRj)j=1 to the real-point virtualization method PVT.

In particular, the assistance RASST receives the measurement signal relating to the first real point sm(PRj)j=1, in particular either directly from the surveying method RER or from a measurement signal reception SM_REC.

In particular, the assistance RASST comprises a check j=0? for checking whether all of the measurements sm relating to the real object ORi have been provided, that is to say whether the measurements sm of all of the real points PRj of the real object ORi have been provided in accordance with the descriptive parameters of the selected object type OTSi. In our example, the measurement signal for the real point PRJ is first surveyed, and then PRJ-1, etc., the assistance RASST decrementing the index j=j-1 until the last real point to be surveyed PR1 of the object ORi.

In particular, the assistance RASST triggers the repetition of the surveying for the other real points PRj, j=1 . . . J of the real object ORi to be surveyed. In particular, the assistance RASST modifies the survey guidance notification ntfOSi based on the remaining real points to be surveyed (For example, when the points for surveying the width of a door have already been surveyed, the notification will be modified so as to trigger the surveying of the door height point).

In particular, for as long as the last real point PR1 has not been surveyed [N], the assistance RASST possibly comprises storing the measurement signal SM_MEM relating to the last surveyed real point sm(PRj) and reiterates, respectively, the surveying RER or the measurement signal reception for another real point $PR_{j-1}$ of the real object OR.

When the last real point PR1 has been surveyed [Y], the method for virtualizing a real area EVT comprises in particular generating OM_GN a measurement signal relating to the surveyed real object om, consisting for example of the set $\{sm(PRj)\}_{j=1 \ldots J}$ of measurement signals relating to the surveyed real points PRj forming the real object ORi.

In particular, the object virtualization method OVT comprises repeating the real-point virtualization step PVT for all of the real points of the real object OR to be virtualized.

In particular, the method for virtualizing real areas EVT comprises repeating the real object virtualization step OVT for all of the real objects in the real area to be virtualized in the real space. In particular, if the real area to be virtualized is a room in an apartment, a house, a building, an area of an open space in an office building, etc., the real objects to be virtualized are elements delimiting the area, such as walls, doors, windows, partitions, ceiling, floor, etc.

For example, when the real-area virtualization method EVT has provided a measurement signal om' for a virtual object OVi corresponding to a real object ORi in the real space ER, the real-area virtualization method EVT comprises a check Nv_O? for determining whether a new real object in the real space should be virtualized. In particular, this check Nv_O? is triggered by the measurement computation VT for the virtual object OV.

If no new object is to be virtualized [N], the real-area virtualization method EVT in particular comprises stopping STP the real-area virtualization method. Otherwise, if a new object is to be virtualized [Y], the real-area virtualization process EVT comprises repeating one or more of the steps of the real-area virtualization method EVT including the method for virtualizing the real points {PRj} of the new object $O_{i+1}$ and the measurement computation VT for the virtual object OV based on the measurement signals for the real points {PRj} of the surveyed new object $O_{i+1}$. In particular, if a new object is to be virtualized [Y], the check Nv_O? triggers ovt_req starting of a virtualization of a real object OVT_ST for a new real object ORi.

The real objects are possibly mobile objects such as windows, doors, chairs, etc. virtualized in the form of interactive mobile virtual objects defined by multiple positions of the virtual object, thus allowing the user UR to move the mobile virtual object through interaction with the mobile virtual object by way of the interaction peripheral. The real area is thus no longer virtualized in three dimensions but in 4 dimensions, allowing the real user UR to move the mobile objects in the real area: for example, to open and/or close the virtual windows, the virtual doors, to move the virtual chair in order to sit virtually at the virtual table, etc.

One particular embodiment of the virtualization method PCT, OCT, EVT is a program comprising program code instructions for executing the steps of the method for virtualizing a real space when said program is executed by a processor.

Figure 7:
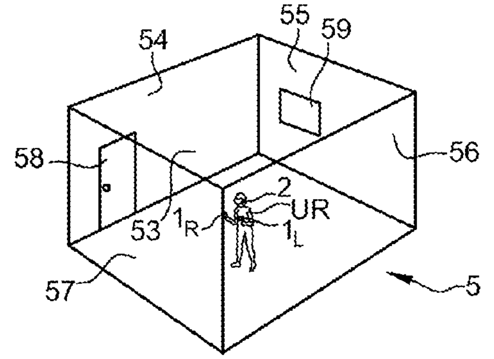
FIG. 7 shows a simplified diagram of a real room to be virtualized according to the invention.

FIG. 7 illustrates a simplified diagram of a real room to be virtualized according to the invention.

FIG. 7 shows a real environment 5, here a room, to be modeled. The real environment is simplified here and comprises for example a room comprising 4 walls 54, 55, 56, 57 and a door 58.

A user UR is situated in the room and equipped with a virtual reality headset 2. One example of a virtual reality headset is a mixed reality or augmented reality headset. It is for example an Oculus Quest headset. The virtual reality headset 2 is associated with at least one interaction peripheral $\mathbf{1}_L$, $\mathbf{1}_R$ (two in FIG. 7), also called controllers, intended to be handled by the user UR of the headset 2, and that allow the user UR to interact in the virtual environment EV projected by the headset 2.

Such a virtual reality headset is in particular an autonomous headset in the sense that it does not require any additional terminal for its operation. In this case, the virtual reality headset implements the virtualization device from FIG. 3. Such a headset 2 is equipped with sensors, for example a camera, in order to continuously detect the movements of the one or more interaction peripherals associated therewith.

Figure 8A:
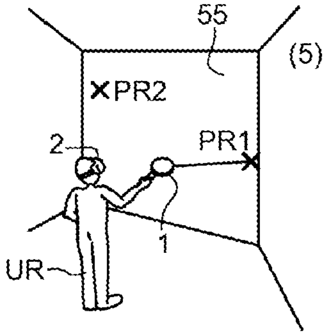
FIG. 8*a* shows a simplified diagram of a survey of a real wall to be virtualized according to the invention.

FIG. 8*a* illustrates a simplified diagram of a survey of a real wall to be virtualized according to the invention.

The user UR positions himself in the room of the real environment 5, for example approximately in the center of the room. In order to virtualize the wall 55 facing him, he directs an interaction peripheral 1 toward a first point PR1 of the wall 55, which he visualizes in particular by way of a sighting signal, for example of the laser type. The user UR then triggers the measurement of the first real point PR1 of the wall 55 to be virtualized. Next, the user UR moves the interaction peripheral 1 toward a second point PR2 of the wall 55 and again triggers a measurement, this time of the second real point PR2 of the wall 55 to be virtualized.

Either, prior to the measurements, the user UR selected the object type to be virtualized from a list of object types: in particular a wall. Plus, the descriptive parameters of a wall make provision to measure two points of the wall, making it possible to generate a plane passing through these two points. In this case, at least one notification requesting the measurement of two distinct points of the wall or a first notification requesting the measurement of a first point of the wall and then a second notification requesting the measurement of a second point of the wall are displayed by the headset for the user UR. The second notification is in particular triggered by the measurement of the first point PR1.

Figure 8B:
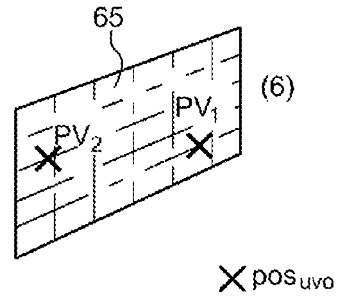
FIG. 8*b* shows a simplified diagram of a reproduction of a virtual wall generated from the surveys of the real wall from FIG. 8*a* according to the invention.

FIG. 8*b* illustrates a simplified diagram of a reproduction of a virtual wall generated from the surveys of the real wall from FIG. 8*a* according to the invention.

Either, prior to the measurements, the user UR selected the object type to be virtualized from a list of object types: in particular a wall. Plus, the descriptive parameters of a wall make provision to measure two points of the wall, making it possible to generate a plane passing through these two points.

Or, after the measurements of the first PR1 and second PR2 points of a wall 55 to be virtualized, the object type to be virtualized: in particular a wall, is selected from a list of object types either automatically based on the measured points PR1, PR2 (number, type of measurement, etc.) or by the user UR from a list of object types to be virtualized.

In particular, the descriptive parameters of a wall make provision to measure two points of the wall, making it possible to generate a plane passing through these two points. In this case, the virtualization device from FIG. 3 implemented in the headset 2 generates, based on the measurements of the two real points PR1 and PR2 provided by the interaction peripheral 1, two virtual points PV1 and PV2, making it possible to render these two real points in the virtual space 6, and then a plane 65 passing through these two virtual points, making it possible to reproduce the real wall 55 in the virtual space 6.

Figure 9A:
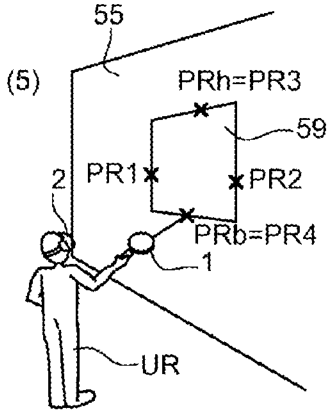
FIG. 9*a* shows a simplified diagram of a survey of a real window to be virtualized on the wall from FIG. 8*a* according to the invention.

FIG. 9*a* illustrates a simplified diagram of a survey of a real window to be virtualized on the wall from FIG. 8*a* according to the invention.

In order to continue the virtualization of a room, the user UR either remains in the same position in the room of the real environment 5 as in FIG. 8*a*, or moves. In order to virtualize the window 59 on the wall 55 facing him, he directs an interaction peripheral 1 toward a point PR4 of the window 59, for example a point at the bottom of the window PRb, which he visualizes in particular by way of a sighting signal, for example of the laser type. The user UR then triggers the measurement of this real point PR4 of the window 59 to be virtualized. Next, the user UR moves the interaction peripheral 1 successively toward the other three points PR3 (point at the top of the window PRh), PR2 (point on one side of the window) and PR1 (point on another side of the window) of the window 59 of the wall 55, and again triggers a measurement, this time, respectively, of the real points PR3, PR2, PR1 of the window 59 to be virtualized.

Either, prior to the measurements, the user UR selected the object type to be virtualized from a list of object types: in particular a window. Plus, the descriptive parameters of a window make provision to measure four points of the window, making it possible to generate a parallelogram passing through these four points. In this case, at least one notification requesting the measurement of four distinct points of the window or a first notification requesting the measurement of a first point of the window and then, successively, other notifications requesting the measurements of the points PR3, PR2, PR1 of the windows are displayed by the headset for the user UR. The following notifications are in particular triggered by the measurement of the previous point, respectively PR4, PR3, PR2.

Figure 9B:
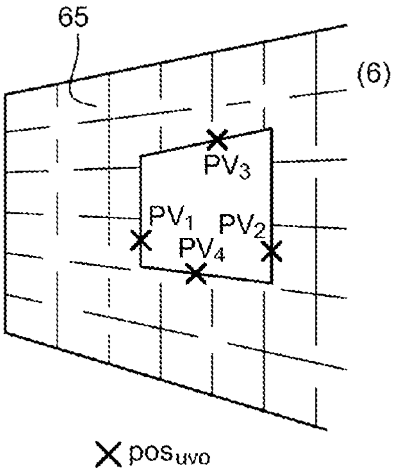
FIG. 9*b* shows a simplified diagram of a reproduction of a virtual wall generated from the surveys of the real wall from FIG. 8*a* and of a virtual window generated from the surveys of the real window from FIG. 9*a* on the virtual wall according to the invention.

FIG. 9*b* illustrates a simplified diagram of a reproduction of a virtual wall generated from the surveys of the real wall from FIG. 8*a* and of a virtual window generated from the surveys of the real window from FIG. 9*a* on the virtual wall according to the invention.

Either, prior to the measurements, the user UR selected the object type to be virtualized from a list of object types: in particular a window. Plus, the descriptive parameters of a window make provision to measure four points of the perimeter of the window, making it possible to generate a parallelogram passing through these four points.

Or, after the measurements of the four points PR1, PR2, PR3 and PR4 of a window 59 to be virtualized, the object type to be virtualized: in particular a window, is selected from a list of object types either automatically based on the measured points PR1, PR2, PR3 and PR4 (number, type of measurement, etc.) or by the user UR from a list of object types to be virtualized.

In particular, the descriptive parameters of a window make provision to measure four points of the window, making it possible to generate a parallelogram passing through these four points. In this case, the virtualization device from FIG. 3 implemented in the headset 2 generates, based on the measurements of the four real points PR1, PR2, PR3 and PR4 provided by the interaction peripheral 1, four virtual points PV1, PV2, PV3 and PV4, making it possible to render these four real points in the virtual space 6, and then a parallelogram 69 passing through these four virtual points, making it possible to reproduce the real window 59 in the virtual space 6.

FIG. 10*a* illustrates a simplified diagram of a survey of a real door to be virtualized on a virtualized real wall according to the invention.

In order to continue the virtualization of the room 5, the user UR moves in particular so as to face another wall 54 of the room 5. The virtualization of the wall 54 takes place in particular as provided for in FIGS. 8*a* and 8*b*.

In order to virtualize the door 58 on the wall 54 facing him, the user UR directs the interaction peripheral 1 toward a point PR3 of the door 58, for example a point at the top of the door PRb, which he visualizes in particular by way of a sighting signal, for example of the laser type. The user UR then triggers the measurement of this real point PR3 of the door 58 to be virtualized. Next, the user UR moves the interaction peripheral 1 successively toward the other two points PR2 (point on one side of the door) and PR1 (point on another side of the door) of the door 58 of the wall 54, and again triggers a measurement, this time, respectively, of the real points PR2, PR1 of the door 58 to be virtualized.

Either, prior to the measurements, the user UR selected the object type to be virtualized from a list of object types: in particular a door. Plus, the descriptive parameters of a door make provision to measure three points of the door, making it possible to generate a parallelogram passing through these three points and having the floor 57 as a bottom side. In this case, at least one notification requesting the measurement of three distinct points of the door or a first notification requesting the measurement of a first point of the door and then, successively, other notifications requesting the measurements of the points PR2, PR1 of the door are displayed by the headset for the user UR. The following notifications are in particular triggered by the measurement of the previous point, respectively PR3, PR2.

FIG. 10*b* illustrates a simplified diagram of a reproduction of a virtual wall and a virtual door generated from the surveys of the real door from FIG. 10*a* on the virtual wall according to the invention.

Either, prior to the measurements, the user UR selected the object type to be virtualized from a list of object types: in particular a door. Plus, the descriptive parameters of a door make provision to measure three points of the perimeter of the door, making it possible to generate a parallelogram passing through these three points and one side of which is the floor 57.

Or, after the measurements of the three points PR1, PR2 and PR3 of a door 58 to be virtualized, the object type to be virtualized: in particular a door, is selected from a list of object types either automatically based on the measured points PR1, PR2 and PR3 (number, type of measurement, etc.) or by the user UR from a list of object types to be virtualized.

In particular, the descriptive parameters of a door make provision to measure three points of the door, making it possible to generate a parallelogram passing through these three points and having the floor 67 as its bottom side. In this case, the virtualization device from FIG. 3 implemented in the headset 2 generates, based on the measurements of the three real points PR1, PR2 and PR3 provided by the interaction peripheral 1, three virtual points PV1, PV2 and PV3, making it possible to render these three real points in the virtual space 6, and then a parallelogram 68 passing through these three virtual points and having the floor 67 as its bottom side, making it possible to reproduce the real door 58 in the virtual space 6.

FIG. 11*a* illustrates a simplified diagram of a survey of a ceiling to be virtualized according to the invention.

In order to virtualize the ceiling 53, the user UR directs the interaction peripheral 1 toward a point PR1 of the ceiling 53, which he visualizes in particular by way of a sighting signal, for example of the laser type. The user UR then triggers the measurement of this real point PR1 of the ceiling 53 to be virtualized. Next, the user UR moves the interaction peripheral 1 to a second point PR2 on the floor (in order to determine the ceiling height) and again triggers a measurement of the real point PR2 from the floor 57.

FIG. 11*b* illustrates a simplified diagram of a reproduction of the ceiling generated from the surveys of the real ceiling from FIG. 11*a* according to the invention.

In particular, the descriptive parameters of a ceiling make provision to measure two points in order to determine the ceiling height (one on the floor and one on the ceiling), making it possible to generate a plane perpendicular to the one or more virtualized walls and passing through a point spaced from the virtual floor 67 by a height obtained from these two points PR1 and PR2. In this case, the virtualization device from FIG. 3 implemented in the headset 2 generates, based on the measurements of the two real points PR1 and PR2 provided by the interaction peripheral 1, a plane parallel to the floor 67 and/or perpendicular to the one or more virtual walls 64, 65 at a height h based on the measured real points PR1 and PR2, making it possible to reproduce the ceiling 63 in the virtual space 6.

FIG. 12 illustrates a simplified diagram of a reproduction of a virtual room generated from the surveys of the real room from FIG. 7 according to the invention.

The invention thus makes it possible to obtain an n-dimensional plan 6 (3 dimensions in the example of FIG. 12) of an empty or furnished room in a simplified manner for the user UR, since the creation of the plan does not require any technical knowledge or the use of complex tools generating risks of surveying errors regardless of the cluttering of the room, since the invention does not require contact between the user UR or a tool manipulated by the user UR and the elements to be measured.

The user UR therefore ultimately has a faithful plan that is quick and easy to create, without the need for any special skills, able to be reproduced by a virtual reality headset 2 allowing virtual reality interaction with objects in the plan: movement in the plan, opening/closing of a door, window, etc. and/or of objects in the plan: moving furniture, trial layout, virtual in-situ interior decoration, etc.

One benefit of the invention is that of allowing a user to perform the surveying of a room without removing the furniture (he points only at the walls), including in very cluttered rooms: the rangefinder only has to remotely access the wall at at least two representative points or by integrating the furniture into the plan (the survey of the furniture is integrated into the measurement).

The invention also targets a medium. The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from a network, in particular from the Internet.

As an alternative, the information medium may be an integrated circuit in which the program is incorporated, the circuit being designed to execute or to be used in the execution of the method in question.

In another implementation, the invention is implemented by way of software and/or hardware components. With this in mind, the term module may correspond equally to a software component or to a hardware component. A software component corresponds to one or more computer programs, one or more subroutines of a program or, more generally, to any element of a program or of software that is capable of implementing a function or a set of functions in accordance with the above description. A hardware component corresponds to any element of a hardware assembly that is capable of implementing a function or a set of functions.

The invention claimed is:

1. An interaction peripheral able to be connected to a virtual reality headset having a display able to reproduce a virtual point in a virtual space and on which or through which a user is able to view a real point in a real space, the interaction peripheral being distinct from the virtual reality headset and comprising:
- a rangefinder configured to provide, while the real point in the real space is viewed on or through the display, the virtual reality headset with a real point measurement signal, in answer to a command of the user of the virtual reality headset by using the interaction peripheral to sight the real point in a real room of the real space, the real point measurement signal comprising a measurement of a relative position of the real point of the real room, the measurement of the relative position of the real point being a distance between the real point and the rangefinder, the real point being sighted by the rangefinder during a survey of positions in the real room, the real point measurement signal being able to allow reproduction of the virtual point in the virtual space rendered by the virtual reality headset during use of the virtual space.

2. The interaction peripheral as claimed in claim 1, wherein the interaction peripheral comprises a direction detector able to provide the virtual reality headset with a signal comprising a direction in which the rangefinder measured the real point.

3. The interaction peripheral as claimed in claim 1, wherein the interaction peripheral comprises a location detector able to provide the virtual reality headset with a signal comprising a position of the interaction peripheral.

4. The interaction peripheral as claimed in claim 1, wherein the interaction peripheral comprises a controller able to be manipulated by the user wearing the virtual reality headset, the controller being configured to activate the rangefinder upon command of the user.

5. The interaction peripheral as claimed in claim 1, wherein the interaction peripheral is a portable peripheral.

6. A surveying method for surveying a real space intended to be integrated into a virtual space by a virtual reality headset having a display able to reproduce a virtual point in the virtual space and on which or through which a user is able to view a real point in the real space, the surveying method being implemented by an interaction peripheral and comprising:
- pointing at the real point in the real space by using a rangefinder of the interaction peripheral, while the real point in the real space is viewed on or through the display; and
- in answer to a command of the user of the virtual reality headset, measuring a relative position of the real point in a real room of the real space sighted by the interaction peripheral during the pointing, the measurement comprising a distance between the real point and the rangefinder, and providing a real point measurement signal comprising the measurement and making it possible to reproduce the virtual point in the virtual space rendered by the virtual reality headset during use of the virtual space.

7. A virtual reality headset able to be connected to an interaction peripheral, the virtual reality headset comprising:

a display configured to reproduce a virtual point in a virtual space and on which or through which a user is able to view a real point in a real space; and a processor which is configured to receive a real point measurement signal for the real point sighted by the interaction peripheral in a real room of the real space in answer to a command of a user of the virtual reality headset by using the interaction peripheral while the real point in the real space is viewed on or through the display during a survey of positions in the real room and to display the virtual point in the virtual space on the display during use of the virtual space, wherein the virtual point is defined by a relative position of the virtual point in the virtual space based on the real point measurement signal for the real point sighted by the interaction peripheral in the real room of the real space, the real point measurement signal representing a distance between the real point and a rangefinder of the interaction peripheral.

8. A method comprising:

reproducing a virtual point in a virtual space rendered by a virtual reality headset and able to be connected to an interaction peripheral and having a display able to reproduce the virtual point in the virtual space and on which or through which a user is able to view a real point in a real space, the reproducing comprising:

displaying on the display or viewing through the display a real room in the real space during a surveying of positions in the real room by the interaction peripheral;

receiving a real point measurement signal for the real point sighted by the interaction peripheral in the real room in answer to a command of the user of the virtual reality headset by using the interaction peripheral while displaying or viewing the real room on or though the display, the real point measurement signal comprising a measurement of a relative position of the real point of the real room, the measurement of the relative position of the real point being a distance between the real point and a rangefinder of the interaction peripheral; and displaying on the display the virtual point in the virtual space, the virtual point being defined by a relative position of the virtual point in the virtual space based on the real point measurement signal for the real point sighted by the interaction peripheral in the real space.

9. A virtualization device for virtualizing a real point in a virtual space rendered by a virtual reality headset having a display able to reproduce a virtual point in a virtual space and on which or through which a user is able to view a real point in a real space and able to be connected to an interaction peripheral, the virtualization device comprising:

a computer which is configured to compute a relative position of the virtual point in the virtual space based on a real point measurement signal for the real point sighted by the interaction peripheral in a real room of the real space in answer to a command of the user of the virtual reality headset while the real point in the real space is viewed on or through the display, the real point measurement signal comprising a measurement of the relative position of the real point, which comprises a distance between the real point and a rangefinder of the interaction peripheral, the computer being configured to receive the real point measurement signal from the interaction peripheral and command display of the virtual point in the virtual space by providing the relative position of the virtual point to the virtual reality headset rendering the virtual space on the display.

10. A method comprising:

virtualizing a real point in a virtual space rendered by a virtual reality headset having a display able to reproduce a virtual point in the virtual space and on which or through which a user is able to view the real point in a real space, the virtual headset being able to be connected to an interaction peripheral, the virtualizing comprising:

computing a relative position of the virtual point in the virtual space based on a real point measurement signal for the real point sighted by the interaction peripheral in a real room of the real space while the real point in the real space is viewed on or through the display in answer to a command of the user of the virtual reality headset during a survey of positions in the real room the real point measurement signal comprising a measurement of the relative position of the real point, which comprises a distance between the real point and a rangefinder of the interaction peripheral; and providing the relative position of the virtual point to the virtual reality headset so as to trigger reproduction on the display of the virtual point in the virtual space.

11. The method of claim 10, further comprising:

virtualizing a real area of the real space in the virtual space rendered by the virtual reality headset, the real area comprising at least one real object, the virtualizing the real area comprising:

performing the virtualizing for real points defining the real object, and generating virtual objects based on relative positions of multiple virtual points as provided by the virtualizing, the generating triggering reproduction of the virtual object in the virtual space by providing at least one dimension of the virtual object and a relative position of the virtual object to the virtual reality headset rendering the virtual space.

12. The method as claimed in claim 11, wherein the method comprises repeating the virtualizing and virtual object generating for multiple objects in the real area, to generate a virtual plan of the real area, the virtual plan comprising the generated virtual objects.

13. A device for virtualizing a real room of a real space in a virtual space rendered by a virtual reality headset having a display able to reproduce a virtual point in the virtual space and on which or through which a user is able to view the real room in the real space, the virtual reality headset being able to be connected to an interaction peripheral, the real room comprising at least one real object, the device for virtualizing comprising:

a real-point virtualization device configured to receive a real point measurement signal for real points defining the real object sighted by the interaction peripheral in the real room of the real space while the real points in the real space are viewed on or through the display in answer to a command of the user of the virtual reality headset by using the interaction peripheral and to perform a virtualization of the real points defining the real object, the real point measurement signal comprising a measurement of the relative positions of the real points, which are distances between the real points and a rangefinder of the interaction peripheral, a virtual object generator configured to generate a virtual object based on relative positions of the virtualized real points provided by the real-point virtualization device, the virtual object generator being configured to trigger reproduction on the display of the virtual object in the virtual space by providing at least one dimension of the virtual object and a relative position of the virtual object in the virtual space to the virtual reality headset rendering the virtual space.

* * * * *